United States Patent
Johnson

(10) Patent No.: US 7,331,588 B2
(45) Date of Patent: Feb. 19, 2008

(54) TRAILING BEAM SUSPENSION WITH ALIGNMENT ADJUSTMENT ASSEMBLY

(75) Inventor: Marc R. Johnson, Grand Rapids, MI (US)

(73) Assignee: SAF-Holland, Inc., Holland, MI (US)

( * ) Notice: Subject to any disclaimer, the term of this patent is extended or adjusted under 35 U.S.C. 154(b) by 0 days.

(21) Appl. No.: 11/153,933

(22) Filed: Jun. 16, 2005

(65) Prior Publication Data
US 2005/0280239 A1    Dec. 22, 2005

Related U.S. Application Data

(60) Provisional application No. 60/580,548, filed on Jun. 17, 2004.

(51) Int. Cl.
B62D 17/00 (2006.01)
B60G 9/02 (2006.01)

(52) U.S. Cl. ............................ 280/86.754; 280/124.116

(58) Field of Classification Search ............. 280/86.75, 280/86.751, 86.753, 86.754, 86.756, 86.757, 280/124.11, 124.111, 124.116
See application file for complete search history.

(56) References Cited

U.S. PATENT DOCUMENTS

| | | | | |
|---|---|---|---|---|
| 2,900,196 | A * | 8/1959 | Nienke | 280/86.756 |
| 3,960,388 | A * | 6/1976 | Strader et al. | 280/86.757 |
| 4,267,896 | A | 5/1981 | Hendriksen | |
| 4,595,216 | A * | 6/1986 | Ware | 280/86.75 |
| 5,163,699 | A * | 11/1992 | Specktor | 280/86.753 |
| 5,201,898 | A * | 4/1993 | Pierce | 280/86.75 |
| 6,131,930 | A * | 10/2000 | Chalin | 280/86.75 |
| 6,240,806 | B1 | 6/2001 | Morris et al. | |
| 6,244,604 | B1 * | 6/2001 | McIntyre | 280/86.753 |
| 6,367,826 | B1 * | 4/2002 | Klais | 280/86.751 |
| 6,409,189 | B1 * | 6/2002 | Orimoto et al. | 280/86.751 |
| 6,425,593 | B2 | 7/2002 | Fabris et al. | |
| 6,550,795 | B1 * | 4/2003 | Schlosser et al. | 280/86.75 |
| 6,659,479 | B1 * | 12/2003 | Raidel et al. | 280/86.75 |
| 2005/0001397 | A1 * | 1/2005 | Genick, II | 280/86.754 |
| 2005/0156398 | A1 * | 7/2005 | Ramsey | 280/124.116 |

* cited by examiner

Primary Examiner—Paul N. Dickson
Assistant Examiner—Barry Gooden, Jr.
(74) Attorney, Agent, or Firm—Price, Heneveld, Cooper, DeWitt & Litton, LLP

(57) ABSTRACT

A trailing beam suspension comprises a hanger bracket adapted to be mounted to a vehicle frame, wherein the hanger bracket includes a mounting aperture, and a trailing beam pivotally mounted to the hanger bracket by a pivot pin extending through the mounting aperture of the hanger bracket. The trailing beam suspension also comprises an adjustable mechanism operably coupled to the hanger bracket including a selector member in operable engagement with the pivot pin and having a plurality of first coupler portions, and at least one second coupler portion that is selectively engageable with at least one of the first coupler portions, wherein adjusting the selector member such that alternative first coupler portions engage the at least one second coupler portion adjust the position of the trailing beam with respect to a vehicle frame rail in a fore-or-aft direction.

22 Claims, 5 Drawing Sheets

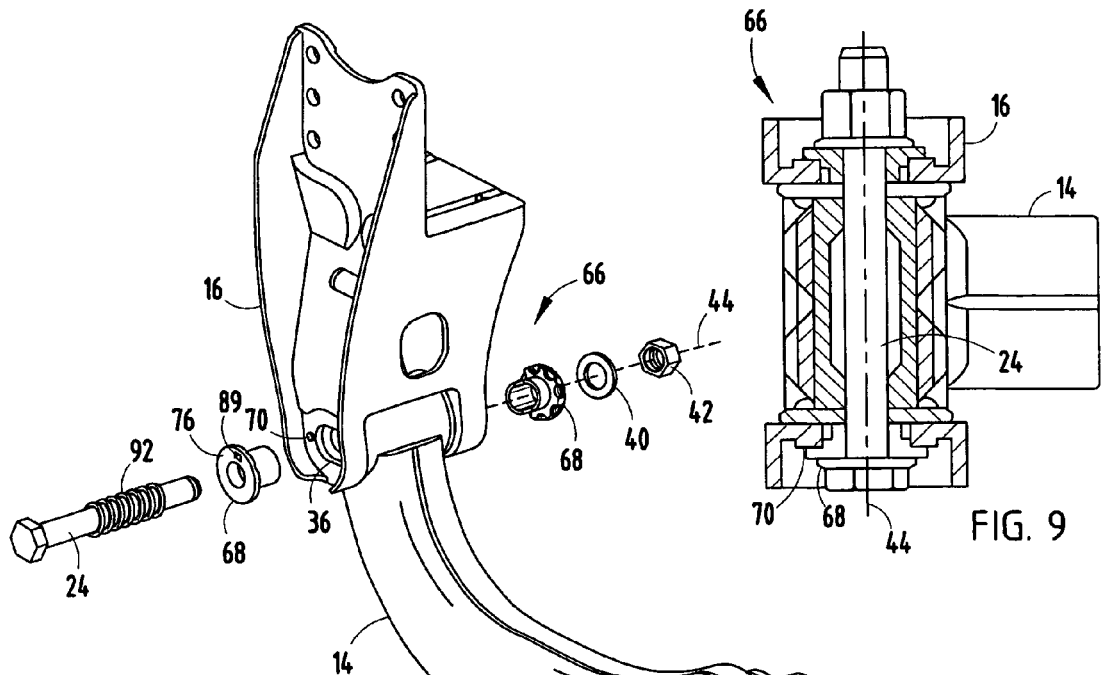
FIG. 9
FIG. 7
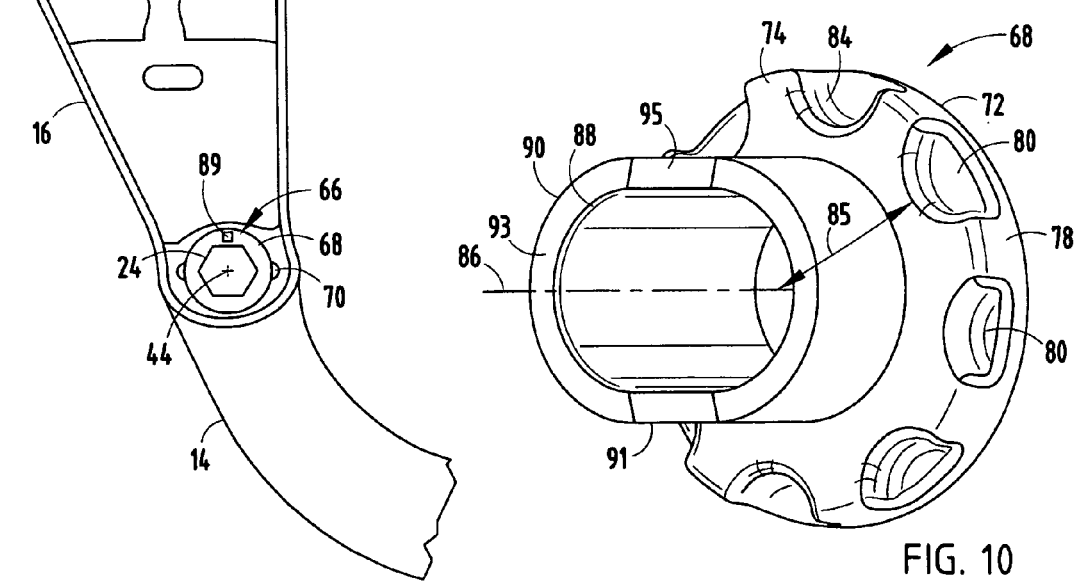
FIG. 8
FIG. 10

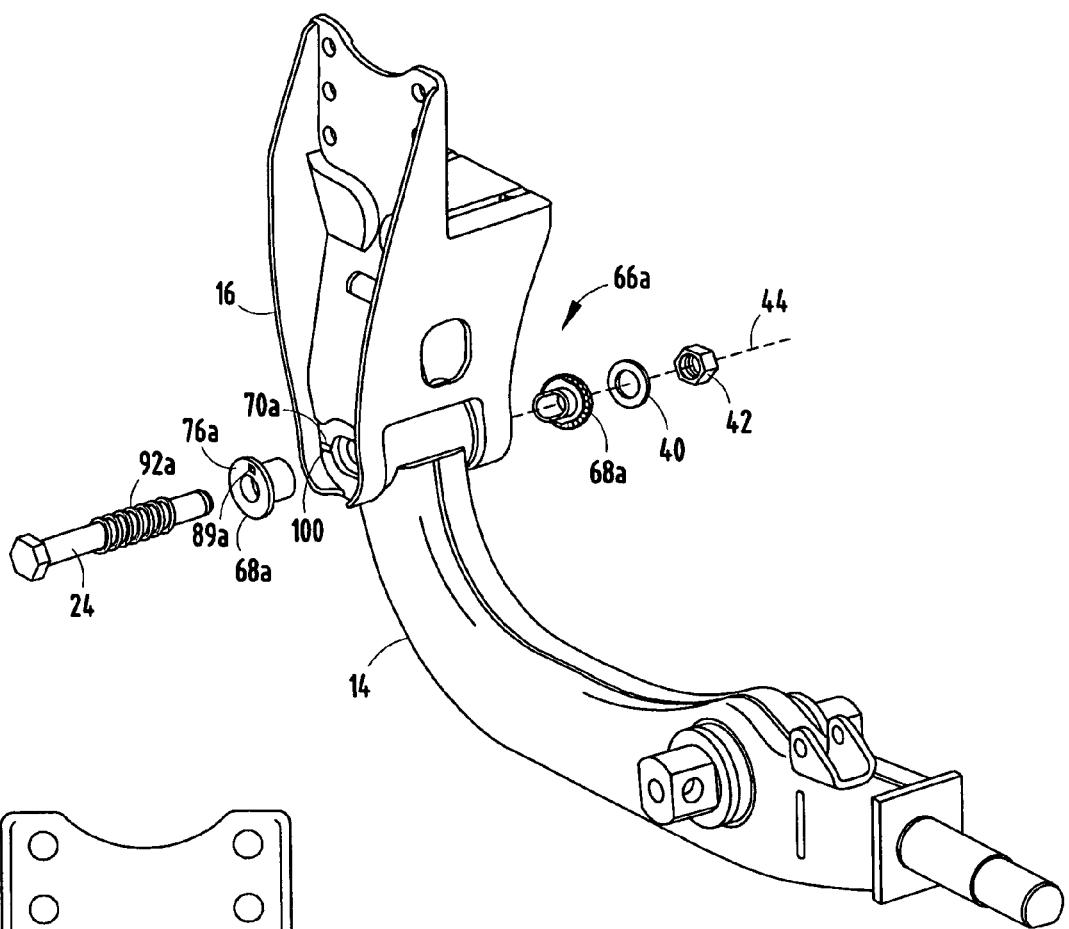
FIG. 11
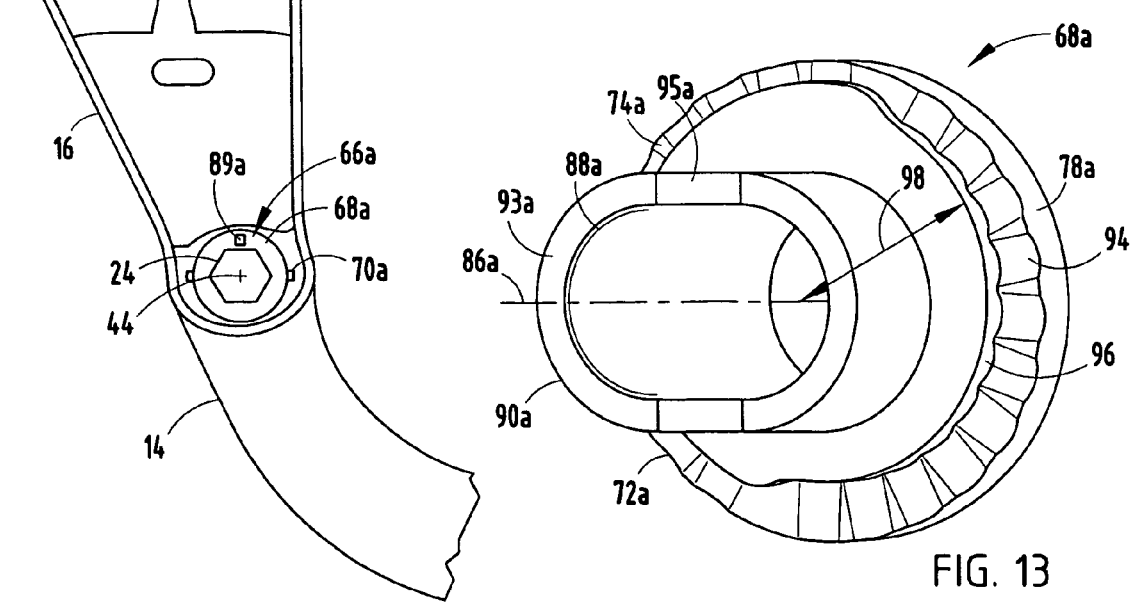
FIG. 12
FIG. 13

TRAILING BEAM SUSPENSION WITH ALIGNMENT ADJUSTMENT ASSEMBLY

CROSS REFERENCE TO RELATED APPLICATION

This application claims the benefit of U.S. Provisional Application No. 60/580,548, filed Jun. 17, 2004, entitled TRAILING BEAM SUSPENSION WITH ALIGNMENT ADJUSTMENT ASSEMBLY, which is hereby incorporated herein by reference in its entirety.

BACKGROUND OF THE INVENTION

The present invention relates to a vehicle suspension, and in particular to a trailing beam suspension for a wheeled vehicle in which the suspension includes a mechanism for four-and-aft adjustment of the alignment of an associated axle and wheels with respect to a longitudinal axis of the associated vehicle, and specifically the forward pivot point of the associated trailing beam assembly.

Proper wheel alignment in road vehicles is important to prevent undue tire wear and to ensure proper vehicle handling and stability. Common causes of improper wheel alignment include improper initial suspension system installation, accidental damage, and impact or shock loads imposed on suspension components by potholes or other irregularities in the road surface.

Wheel alignment adjustment mechanisms permit adjustment of the alignment of vehicle axles and wheel with respect to the vehicle frame. Adjustment mechanisms are generally one of two types: those that are adjustable as the suspension is installed on the vehicle and then permanently fixed in the adjusted position by welding and the like; and, those that are adjustable any time during and after installation and are held in the adjustment position mechanically, as described below.

Strader et al., U.S. Pat. No. 3,960,388, is exemplary of the first category of alignment devices. The Strader '388 patent discloses a trailing beam suspension that incorporates a mounting plate for the trailing beam having a pair of bosses that engage slots in the hanger bracket. The trailing beam is attached to the hanger bracket by a bolted connection in which the bolt passes through the mounting plate and is secured with a nut. The bolt head engages the mounting plate so that rotating the bolt pivots the mounting plate out of one of the bosses. Pivoting of the mounting plate moves the bolts fore or aft, which moves the trailing beam fore or aft to align the axle. When the axles and wheels have been properly aligned, the plate is welded to the hanger bracket. Further adjustment is possible only after removing the weld.

U.S. Pat. No. Re. 30,308 to Masser discloses a trailing beam suspension system incorporating a mounting plate for the trailing beam having a single boss that engages a slot in the hanger bracket. The pivot bolt for the trailing beam passes through the mounting plate and slot. The trailing beam is moved fore or aft until proper alignment of the axle and wheels is achieved. The mounting plate is then welded to the hanger bracket. Further adjustment is possible only after removing the weld.

Richardson, U.S. Pat. No. 4,991,872, discloses a trailing beam suspension for a low-bed trailer. The forward trailing beam of a pair of trailer beams is mounted to the intermediate, inclined portion of the main structure beam of the trailer through a bushing assembly. The bushing assembly is coupled to the web of the beam by a bolted connection. The web is provided with slotted mounting holes that enable adjustment of the alignment of the trailing beam and the attached axle. The trailing beam is moved fore or aft until the axle and wheels are properly aligned. After adjustment, the bushing assembly is welded to the beam. Further adjustment requires removal of the weld and loosening of four bolts connecting the bushing assembly to the trailer beam.

An example of the second category of alignment devices is disclosed in U.S. Pat. No. 5,201,898 to Pierce. The Pierce '898 patent discloses a trailing beam suspension incorporating a pair of complementary discs that engage each other with a channel arrangement with the trailing beam mounting boat passing therethrough. One of the discs is welded to the hanger bracket and incorporates an asymmetrical hole. The second disc contains an off-center hole that is rotatable relative to the first. The rotation of the second disc relative to the first is translated into lateral movement of the trailing beam mounting boat. It is necessary to restrain the second disc against further rotation while the connection is tightened to prevent movement of the trailing beam from its aligned position.

In light of the aforementioned alignment adjustment mechanisms, a vehicle suspension alignment adjustment assembly is desired that allows alignment subsequent to the coupling of the vehicle suspension assembly with the associated vehicle, provides an ease of use with respect to that adjustment, and allows for adjustment in primarily a fore-and-aft direction without requiring the associated suspension components to be swung through an arc during adjustment, thereby maintaining the spatial relationship between the components of interest during adjustment and alignment of the suspension assembly.

SUMMARY OF THE INVENTION

One aspect of the present invention is to provide a trailing beam suspension for a vehicle that comprises a hanger bracket adapted to be mounted to a vehicle frame, wherein the hanger bracket includes a mounting aperture, and a trailing beam pivotally mounted to the hanger bracket by a pivot pin extending through the mounting aperture of the hanger bracket. The trailing beam suspension also comprises an adjustment mechanism operably coupled to the hanger bracket including a selector member in operable engagement with the pivot pin and having a plurality of first coupler portions, and at least one second coupler portion that is selectively engageable with at least one of the first coupler portions, wherein adjusting the selector member such that alternative first coupler portions engage the at least one second coupler portion adjusts the position of the trailing beam with respect to a vehicle frame rail in a fore or aft direction.

Another aspect of the present invention is to provide a trailing beam suspension for a vehicle that comprises a hanger bracket adapted to be mounted to a vehicle frame rail, wherein the hanger bracket includes a mounting aperture, and a trailing beam pivotally mounted to the hanger bracket by a pivot pin extending through the mounting aperture of the hanger bracket. The trailing arm suspension also comprises an adjustment mechanism operably coupled to the hanger bracket that includes a selector member having an aperture that receives the pivot pin and having a plurality of notches spaced about a periphery of the selector member, wherein each notch of the plurality of notches defines a distance between the notch and a centroidal axis of the aperture of the selector member, and wherein the distance defined by each notch is different from the distance defined by at least one other notch. The adjustment mechanism also includes at least one tab member that is selectively engageable with at least one of the notches of the selector member, wherein adjusting the selector member such that alternative notches engage the at least one tab member adjusts the position of the trailing beam with respect to the vehicle frame rail in a fore or aft direction.

Yet another aspect of the present invention is to provide a trailing beam suspension for a vehicle that includes a hanger bracket adapted to be mounted to a vehicle frame rail, wherein the hanger bracket includes a mounting aperture, and a trailing beam pivotally mounted to the hanger bracket by a pivot pin extending through the mounting aperture of the hanger bracket. The trailing beam suspension also includes an adjustment mechanism operably coupled to the hanger bracket that includes a selector member having an aperture that receives the pivot pin and having a plurality of notches spaced about the periphery of the selector member, wherein a distance between each notch and a centroidal axis of the aperture of the selector member is defined by a cam wall extending about the aperture of the selector member, and wherein a radius of the cam wall changes about the circumference of the selector member. The adjustment mechanism also includes at least one tab member that is selectively engageable with at least one of the notches of the selector member, wherein adjusting the selector member such that alternative notches engage the at least one tab member adjusts the position of the trailing beam with respect to the vehicle frame rail in a fore or aft direction.

The present inventive alignment adjustment assembly provides an uncomplicated design, can be easily and quickly assembled and adjusted subsequent to assembly with an associated vehicle frame, is efficient in use, capable of a long operating life, and is particularly well adapted for the proposed use. Moreover, the adjustment assembly the associated vehicle, provides an ease of use with respect to that adjustment, and allows for adjustment in primarily a fore-and-aft direction without requiring the associated suspension components to be swung through an arc during adjustment, thereby maintaining the spatial relationship between the components of interest during adjustment and alignment of the suspension assembly.

These and other advantages of the invention will be further understood and appreciated by those skilled in the art by reference to the following written specification, claims and appended drawings.

BRIEF DESCRIPTION OF THE DRAWINGS

FIG. 7 is a perspective view of a trailing beam supported from a hanger bracket via a first embodiment of the alignment adjustment assembly embodying the present invention;

FIG. 8 is a side view of the trailing beam supported from the hanger bracket by the first embodiment of the alignment adjustment assembly;

FIG. 9 is a cross-sectional view of the first embodiment of the alignment adjustment assembly;

FIG. 10 is an enlarged perspective view of a selector member of the first embodiment of the alignment adjustment assembly;

FIG. 11 is a trailing beam supported from a hanger bracket by a second embodiment of the alignment adjustment assembly;

FIG. 12 is a side view of the trailing beam supported from the hanger bracket via the second embodiment of the alignment adjustment assembly; and FIG. 13 is an enlarged perspective view of a selector member of the second embodiment of the alignment adjustment assembly.

DETAILED DESCRIPTION OF THE PREFERRED EMBODIMENTS

Figure 1:
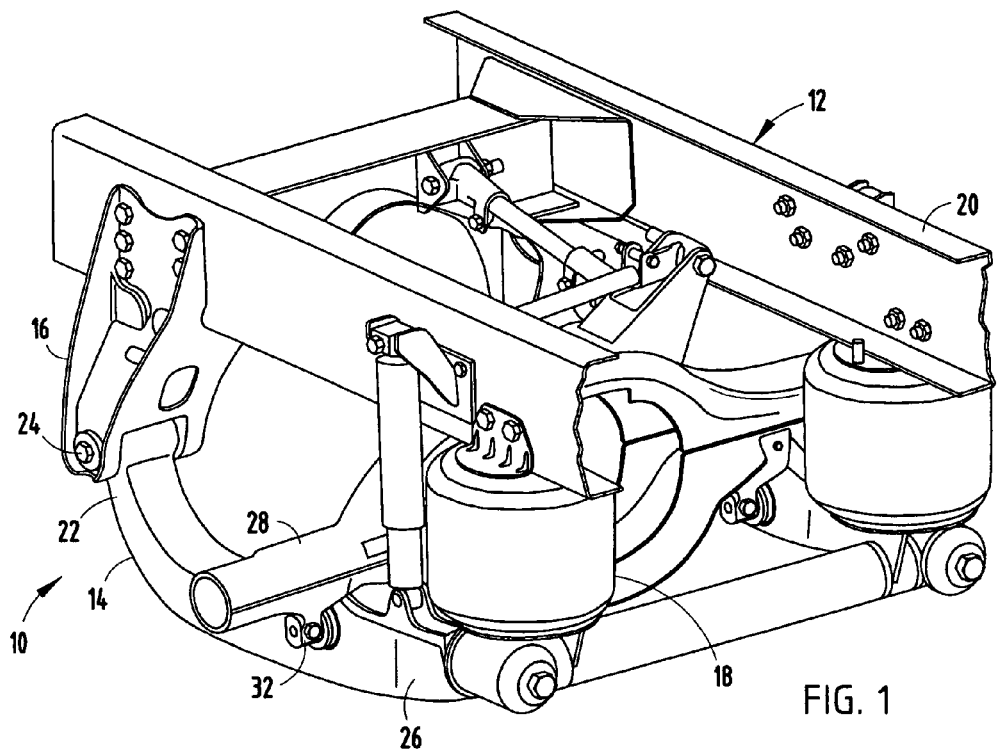
FIG. 1 is a perspective view of a vehicle frame and a vehicle suspension assembly.
Figure 2:
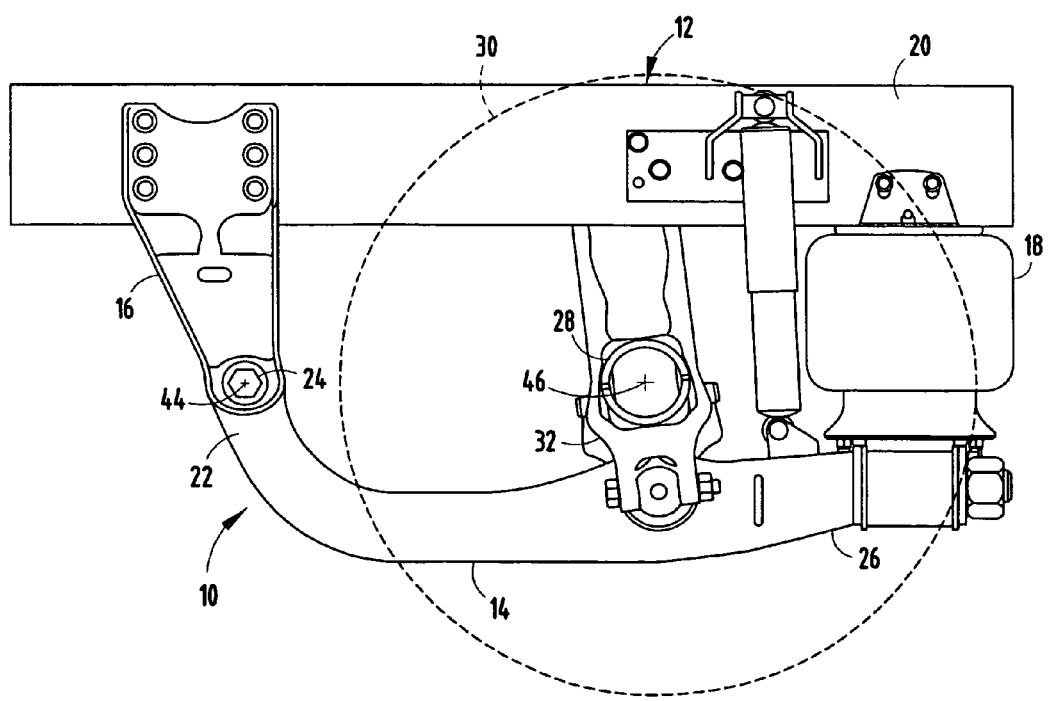
FIG. 2 is a side view of the vehicle frame and the vehicle suspension assembly.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1 and 2) generally designates a trailing beam suspension system embodying the present invention, and supporting a vehicle frame 12 therefrom. In the illustrated example, the suspension system 10 generally comprises a trailing beam 14, a hanger bracket 16, and an air spring 18. The hanger bracket 16 is attached in a conventional manner to a vehicle frame rail 20 of the vehicle frame 12. A first end 22 of the trailing beam 14 is pivotally mounted to the hanger bracket 16 via a pivot bolt 24 and a conventional bushed connector. A second end 26 of the trailing beam 14 is attached in a conventional manner to the air spring 18 so that the air spring 18 is disposed in load transmitting relation between the trailing beam 14 and the frame rail 20. An axle 28 supports a wheel 30 and is coupled to the trailing beam 14 by an axle bracket 32.

Figure 3:
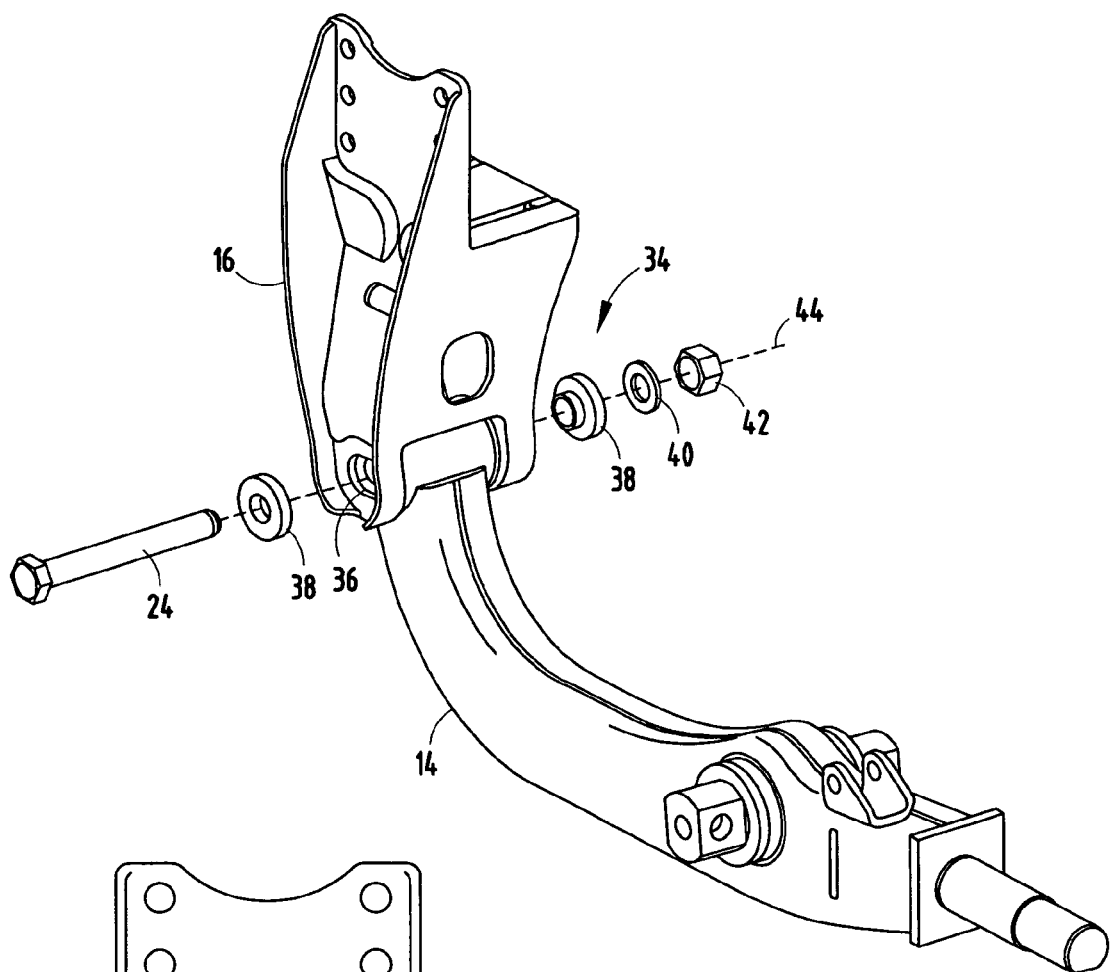
FIG. 3 is a perspective view of a trailing beam supported from a hanger bracket via a prior art welded-type couple.
Figure 4:
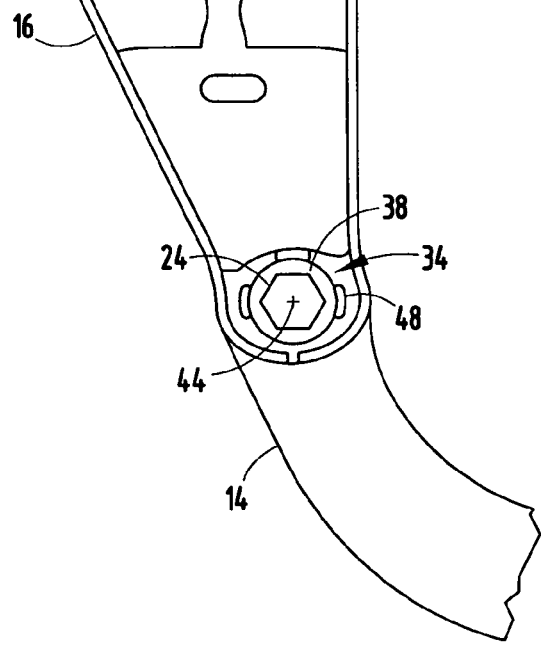
FIG. 4 is a side view of the trailing beam by the hanger bracket via the welded couple.

As previously described, one prior art method, as best illustrated in FIGS. 3 and 4, includes supporting the trailing beam 14 from the hanger bracket 16 via a welded-type assembly 34. Specifically, the hanger bracket 16 includes an elongated adjustment slot 36 that slidably receives the pivot bolt 24 therein. The pivot bolt also extends through a pair of spacer members 38 and a washer 40, wherein the spacer members 38 are opposed across the hanger bracket 16 from one another. The pivot bolt 24 is held in initial assembly via an associated nut 42. Subsequent to connection of the trailing beam 14 with the hanger bracket 16, the adjustment of the axis 44 of the pivot bolt 24, and thus the axis 46 of the axle 28, is adjusted with respect to a longitudinal axis of the vehicle frame 12, by adjusting the location of the pivot bolt 24 within the adjustment slot 36 of the associated hanger bracket 16. The pivot bolt 24 and the nut 24 are tightened, and each spacer member 38 is then welded to the hanger bracket 16 at a plurality of locations 48 about the periphery of the associated spacer member 38, thereby securely fixing the location and alignment of the axis 46 of the axle 29 with respect to the longitudinal axis of the vehicle frame 12.

Figure 5:
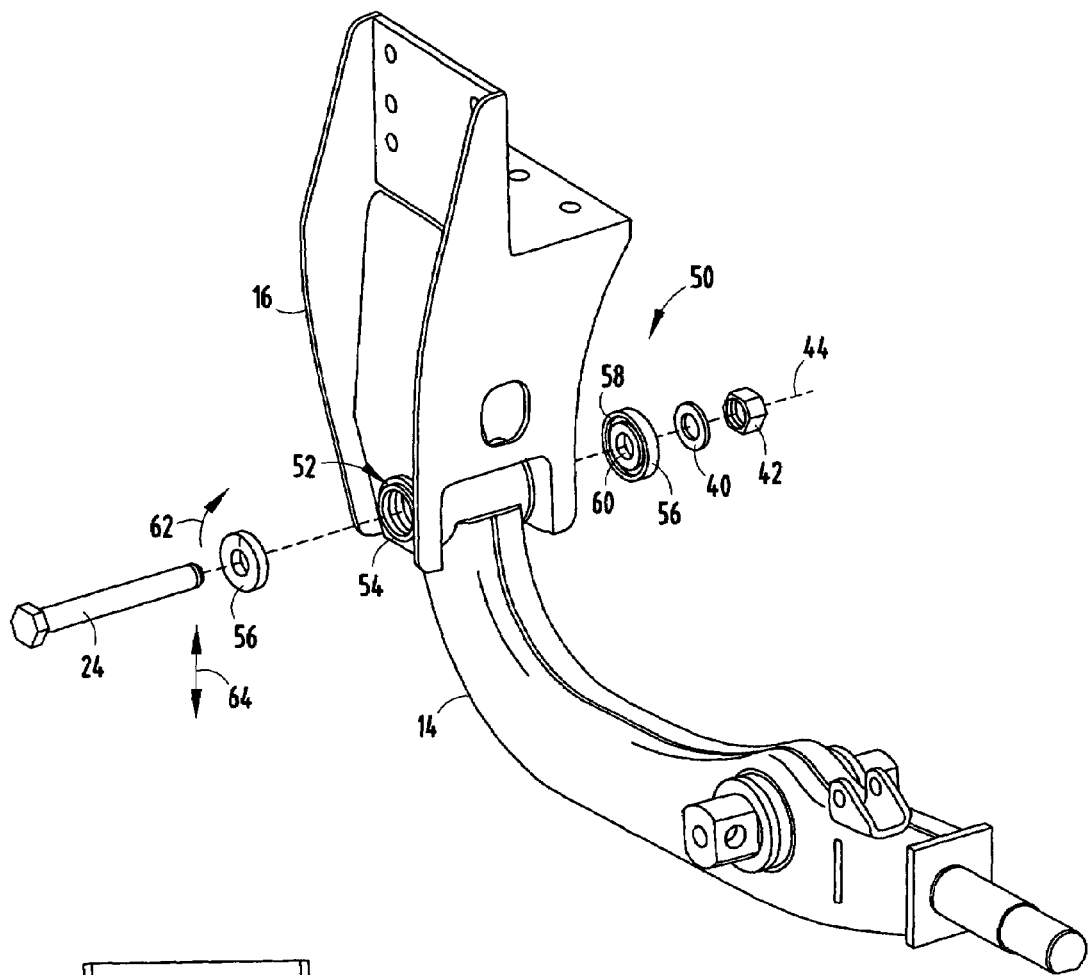
FIG. 5 is a perspective view of a trailing beam supported from a hanger bracket via a prior art eccentric-type couple.
Figure 6:
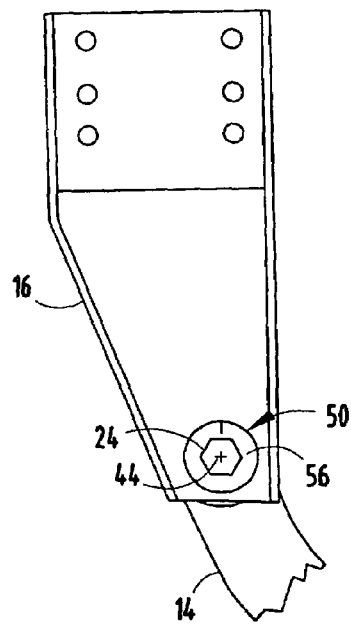
FIG. 6 is a side view of the trailing beam supported by the hanger bracket via the eccentric couple.

FIGS. 5 and 6 best illustrate the prior art eccentric-type assembly 50 as previously discussed. The eccentric-type assembly 50 includes a pair of bosses affixed to the hanger bracket 16 opposed across the hanger bracket 16 from one another. Each boss 52 includes a raised rim 54. The eccentric-type assembly 50 also includes an adjustment member 56 having a circumferentially extending groove 58 that receives the rim 54 of the associated boss 52 therein, and an off-center aperture 60 extending therethrough. Adjustment of the position of the axis 44 of the pivot bolt 24, and therefore the position of the axis 46 of the axle 28, is accomplished by rotating each adjustment member 56 with respect to the associated boss 52, thereby forcing the axis 44 through an arcuate path 62. It should be noted that the off-center location of the aperture 60 within each adjustment member 56, while forcing the adjustment of the location of the axis 46 of the axle 28 with respect to the longitudinal axis of the vehicle frame 12, also forces an adjustment of the axis 44 of the pivot bolt 24 in a vertical direction 64 and alters the relative positioning of the components of suspension system 10 with respect to one another in a vertical direction.

The reference numeral 66 (FIGS. 7-9) generally designates a first embodiment of the alignment adjustment assembly embodying the present invention. In the illustrated example, the alignment adjustment assembly 66 includes a pair of disc-shaped selector members 68 and a pair of engagement tabs 70. As best illustrated in FIGS. 7 and 10, each selector member 68 includes a disc-shaped body portion 72 having an inner surface 74, an outer surface 76, and a circumferentially-extending outer edge 78. Each selector member 68 also includes a plurality of discrete coupler portions in the form of U-shaped notches 80 extending inwardly into the inner surface 74 and the outer edge 78, and spaced about the outer edge 78. Each notch 80 is defined by an inner wall 84, wherein each wall 84 defines an adjustment distance 85 between the wall 84 and a centroidal axis 86 of an aperture 88 extending through the selector members 68. The adjustment distance 85 differs for each notch 80. The outer surface 76 includes a square-shaped aperture 89 adapted to receive an adjustment tool therein. It should be noted that other configurations for the aperture 89 may be utilized to allow for the use of variously-configured wrenches and adjustment tools. A cylindrically-shaped boss 90 extends outwardly from the inner surface 74, is concentrically-located about the centroidal axis 86, and includes an arcuated extension 91 defining an end wall 93 and engagement walls 95. Each tab 70 is cylindrically-shaped and is fixedly secured to hanger bracket 16.

In assembly, the boss 90 of each selector member 68 is located within the adjustment slot 36 of the hanger bracket 16, such that the engagement walls 95 of each of the selector members 68 abut one another, thereby locking the same in rotation, and the tabs 70 engage oppositely-located notches 80 of the selector members 68. It should be noted that other configurations for each boss 90 that do not require interlocking of the same may be utilized. The adjustment distance 85 as defined by the walls 84 of each of the notches 80 selectively positions the axis 44 of the pivot bolt 24 and the axis 86 of each of the selector members 68, and therefore the axis 46 of the axle 28 with respect to the longitudinal axis of the associated vehicle. It should be noted that the tabs 70 and the notches 80 are located with respect to the hanger bracket 16, and the associated selector members 68, respectively, such that adjustment of the axis 44 and the axis 86, and therefore the axis 46, are done along a linear path with respect to the longitudinal axis of the vehicle frame 12. Each selector member 68 is secured in a particular pre-selected position by securely tightening the pivot bolt 24 with the associated nut 42. Alternatively, a spring member 92, such as coil spring, may be positioned so as to bias each of the selector members 68 into engagement with the tabs 70. In adjustment, the spring member 92 allows adjustment of the selector members 68 without requiring significant loosening of the associated nut 42.

The reference numeral 66a (FIGS. 11 and 12) generally designates another embodiment of the alignment adjustment assembly of the present invention. Since the alignment adjustment assembly 66a is similar to the previously-described alignment adjustment assembly 66, similar parts appearing in FIGS. 7-10 and FIGS. 11-13, respectively are represented by the same, corresponding reference numeral except for the suffix "a" in the numerals of the latter. In the illustrated example, the alignment adjustment assembly 66a includes a pair of selector members 68a and a plurality of tabs 70a. Each selector member 68a (FIG. 13) includes a disc-shaped body portion 72a including an inner surface 74a, an outer surface 76a, and an outer edge 78a extending about the periphery thereof. Each selector member 68a also includes a centroidal axis 86a extending through a centrally-located aperture 88a, and a cylindrically-shaped boss 90a concentrically located about the centroidal axis 86a. A plurality of cup-shaped notches 94 extend inwardly from the outer edge 78 and are spaced about the periphery of the selector member 68. A cam-wall 96 extends inwardly from the inner surface 74 and is inwardly spaced from the outer edge 78a. The cam-wall 96 extends circumferentially about the centroidal axis 86a and defines a distance 98 that differs about the circumference of the selector member 68a. Each tab 70a includes an inwardly-disposed, arcuately-shaped engagement surface 100.

In assembly, the boss 90a of each selector member 68a is located within the adjustment slot 36 of the hanger bracket 16, such that the engagement walls 95a of each selector member 68 abut one another, thereby locking the same in rotation, and the tabs 70a engage oppositely-located notches 94 of the selector members 68a, and abut opposing surfaces of the cam-wall 96. The varying distance 98 as defined by the cam-wall 96 selectively positions the axis 44 of the pivot bolt 24 and the axis 86a of each of the selector members 68a, and therefore the axis 46 of the axle 28, with respect to the longitudinal axis of the associated vehicle. It should be noted that the tabs 70a and the centroidal axis 86a of the selector members 68a are located with respect to the hanger bracket 16, such that adjustment of the axis 44 and the axis 86, and therefore the axis 46, are done along a linear path with respect to the longitudinal axis of the vehicle frame 12. Each selector member 68a is secured in a particular pre-selected position by securely tightening the pivot bolt 24 with the associated nut 42. Alternatively, a spring member 92a, such as coil spring, may be positioned so as to bias each of the selector members 68a into engagement with the tabs 70a. In adjustment, the spring member 92a allows adjustment of the selector members 68a without requiring significant loosening of the associated nut 42.

In the foregoing description, it will be readily appreciate by those skilled in the art that modifications may be made to the invention without departing from the concepts disclosed herein. Such modifications are to be considered as included in the following claims, unless the claims by their language expressly state otherwise.

The invention claimed is:

1. A trailing beam suspension for a vehicle, comprising:
a hanger bracket adapted to be mounted to a vehicle frame rail, the hanger bracket including a mounting aperture;
a trailing beam pivotally mounted to the hanger bracket by a pivot pin extending through the mounting aperture of the hanger bracket;
an adjustment mechanism operably coupled to the hanger bracket, comprising:
a selector member in operable engagement with the pivot pin and having a plurality of discrete first coupler portions; and
at least one second coupler portion that is selectively engageable with at least one of the first coupler portions, wherein adjusting the selector member such that alternative first coupler portions engage the at least one second coupler member adjusts the position of the trailing beam with respect to a vehicle frame rail in a fore or aft direction.

2. The trailing beam suspension of claim 1, wherein the aperture of the selector member is substantially centrally located therein.

3. The trailing beam suspension of claim 1, wherein the plurality of the first coupler portions includes a plurality of notches spaced about a periphery thereof.

4. The trailing beam suspension of claim 3, wherein each notch of the plurality of plurality of notches defines a distance between the notch and a centroidal axis of the aperture of the selector member, and wherein distance defined by each notch is different from the distance defined by at least one other notch.

5. The trailing beam suspension of claim 4, wherein the distance between each notch and the centroidal axis of the aperture of the selector member is defined by a cam wall extending about the aperture of the selector member, and wherein a radius of the cam wall changes about the circumference of the selector member.

6. The trailing beam suspension of claim 5, wherein the at least one second coupler includes a pair of tab members that are receivable within a pair of the notches opposed across the selector member from one another, and wherein the location of the aperture with respect to the hanger bracket is adjusted by abutment of the pair of tab members with the cam wall.

7. The trailing beam suspension of claim 4, wherein the at least one second coupler includes a pair of tab members that are receivable within a pair of the notches opposed across the selector member from one another.

8. The trailing beam suspension of claim 7, wherein each notch and the pair of tab members is provided an arcuately-shaped cross-sectional configuration.

9. The trailing beam suspension of claim 7, wherein the pair of tab members are fixedly secured to the hanger bracket.

10. The trailing beam suspension of claim 1, wherein the selector member is adjusted by rotating the selector member about the pin.

11. The trailing beam suspension of claim 1, further including:
a biasing member that biases at least one of the plurality of first coupler portions into engagement with the at least one second coupler portions.

12. The trailing beam suspension of claim 1, wherein the first and second coupler portions are locked in rotation with one another.

13. A trailing beam suspension for a vehicle, comprising:
a hanger bracket adapted to be mounted to a vehicle frame rail, the hanger bracket including a mounting aperture;
a trailing beam pivotally mounted to the hanger bracket by a pivot pin extending though the mounting aperture of the hanger bracket;
an adjustment mechanism operably coupled to the hanger bracket, comprising:
a selector member having an aperture that receives the pivot pin and having a plurality of notches spaced about a periphery of the selector member, wherein each notch of the plurality of notches defines a distance between the notch and a centroidal axis of the aperture of the selector member, and wherein the distance defined by each notch is different from the distance defined by at least one other notch; and
at least one tab member that is selectively engageable with at least one of the notches of the selector member, wherein adjusting the selector member such that alternative notches engage the at least one tab member adjusts the position of the trailing beam with respect to a vehicle frame rail in a fore or aft direction.

14. The trailing beam suspension of claim 13, wherein each notch and the at least one tab member is provided an arcuately-shaped cross-sectional configuration.

15. The trailing beam suspension of claim 13, wherein the at least one tab member is fixedly secured to the hanger bracket.

16. The trailing beam suspension of claim 13, wherein the selector member is adjusted by rotating the selector member about the pin.

17. The trailing beam suspension of claim 13, further including:
a biasing member that biases at least one of the notches into engagement with the at least one tab member.

18. A trailing beam suspension for a vehicle, comprising:
a hanger bracket adapted to be mounted to a vehicle frame rail, the hanger bracket including a mounting aperture;
a trailing beam pivotally mounted to the hanger bracket by a pivot pin extending though the mounting aperture of the hanger bracket;
an adjustment mechanism operably coupled to the hanger bracket, comprising:
a selector member having an aperture that receives the pivot pin and having a plurality of notches spaced about a periphery of the selector member, wherein a distance between each notch and a centroidal axis of the aperture of the selector member is defined by a cam wall extending about the aperture of the selector member, and wherein a radius of the cam wall changes about the circumference of the selector member; and
at least one tab member that is selectively engageable with at least one of the notches of the selector member, wherein adjusting the selector member such that alternative notches engage the at least one tab member adjusts the position of the trailing beam with respect to a vehicle frame rail in a fore or aft direction.

19. The trailing beam suspension of claim 18, wherein each of the notches and the at least one tab member is provided an arcuately-shaped cross-sectional configuration.

20. The trailing beam suspension of claim 18, wherein the at least one tab member is fixedly secured to the hanger bracket.

21. The trailing beam suspension of claim 18, wherein the selector member is adjusted by rotating the selector member about the pin.

22. The trailing beam suspension of claim 18, further including:
a biasing member that biases at least one of the notches into engagement with the at least one tab member.

* * * * *